United States Patent [19]
Ashton

[11] Patent Number: 5,348,050
[45] Date of Patent: Sep. 20, 1994

[54] MAGNETIC FLUID TREATMENT DEVICE

[76] Inventor: Thomas E. Ashton, 8215 Crudele Dr., Garfield Heights, Ohio 44125

[21] Appl. No.: 93,476

[22] Filed: Jul. 19, 1993

[51] Int. Cl.$^5$ .................................................. F15C 1/04
[52] U.S. Cl. .................................... 137/827; 210/222
[58] Field of Search ........................ 137/827; 210/222

[56] References Cited

U.S. PATENT DOCUMENTS

| | | | |
|---|---|---|---|
| 4,146,479 | 3/1979 | Brown | 210/222 |
| 4,367,143 | 1/1983 | Carpenter | 210/222 |
| 4,568,901 | 2/1986 | Adam | 210/222 |
| 4,605,498 | 8/1986 | Kulish | 210/222 |
| 4,711,271 | 12/1987 | Weisenberger et al. | 137/827 |
| 4,808,306 | 2/1989 | Mitchell | 210/222 |
| 4,995,425 | 2/1991 | Weisenberger et al. | 137/827 |
| 5,055,189 | 10/1991 | Ito | 210/222 |

FOREIGN PATENT DOCUMENTS

| | | | |
|---|---|---|---|
| 149788 | 12/1960 | U.S.S.R. | 210/222 |

*Primary Examiner*—A. Michael Chambers
*Attorney, Agent, or Firm*—Renner, Kenner, Greive, Bobak, Taylor & Weber

[57] ABSTRACT

A magnetic fluid treatment device is provided in which elongated cup shaped members are aligned to form a tube about a fluid conducting conduit. Interposed between the conduit and the elongated cup shaped member are a plurality of magnets which are arranged in diametrically opposed pairs within the tube. According to one embodiment of the invention, the cup shaped members are secured about the fluid conducting conduit by interconnecting longitudinally extending flanges. According to another embodiment of the invention, the elongated cup shaped members are received within a housing having end caps closing the ends thereof about the fluid conducting conduit. Each end of the conduit is provided with an adapter or appropriate connector to then be received within a conduit carrying the fluid to be treated.

6 Claims, 4 Drawing Sheets

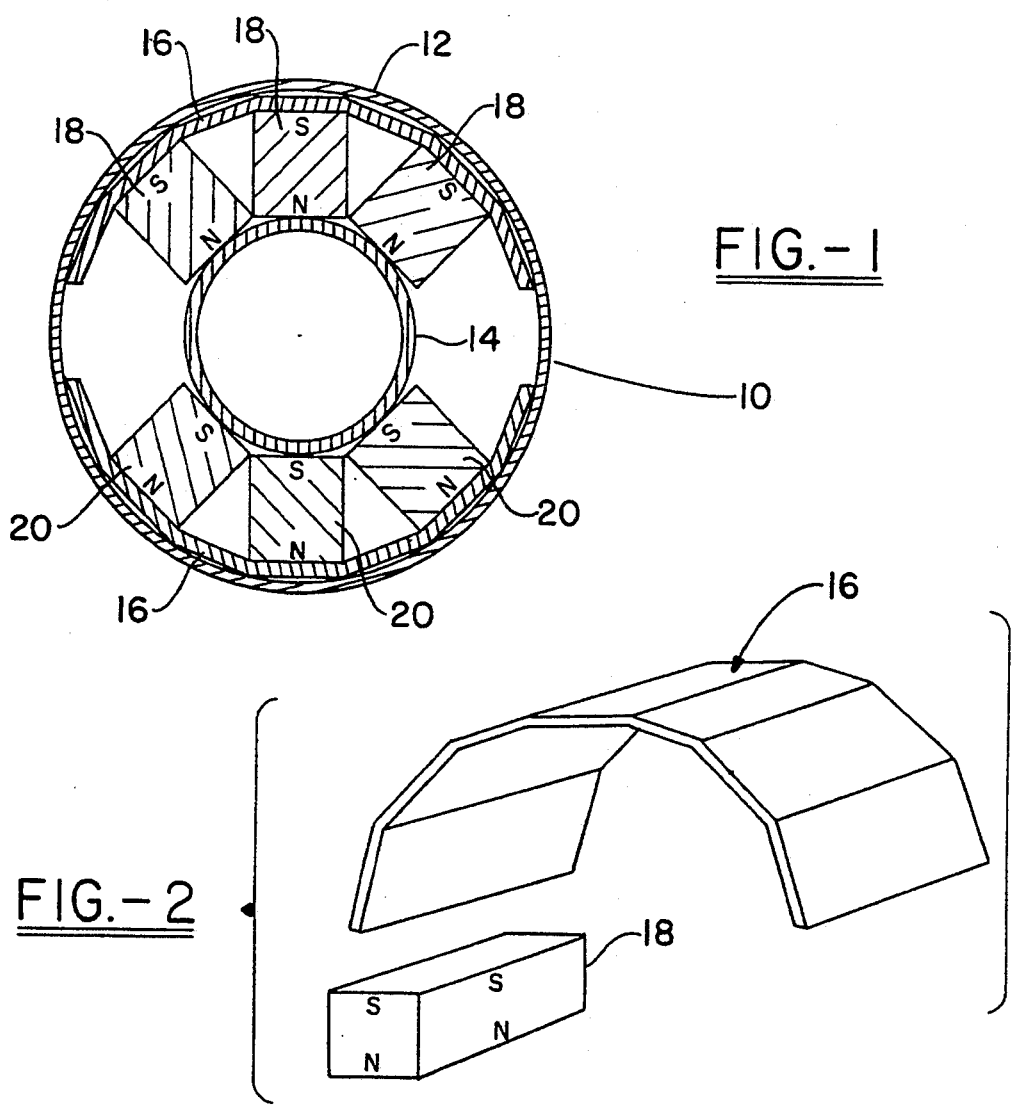
FIG.-1
FIG.-2
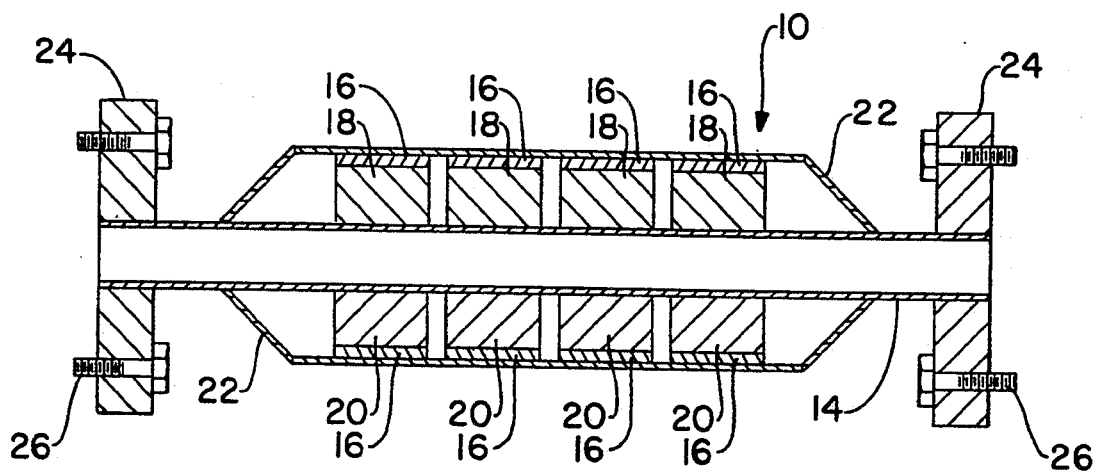
FIG.-3

MAGNETIC FLUID TREATMENT DEVICE

TECHNICAL FIELD

The invention herein resides in the art of magnetic fluid treatment devices of the type employed to induce a magnetic field into the fluid path of a conduit to reduce crust and scale buildup on the conduit walls. The invention particularly relates to a magnetic fluid treatment device in which the magnetic field induced into the flow path of the fluid is substantially totally orthogonal to the axis of such flow path.

BACKGROUND ART

The science of affecting fluids by submitting them to magnetic fields has been recognized and used for many years. The phenomenon is known as magnetohydrodynamics. It is based on the observations of Michael Faraday and explained as the electromotive forces generated by passing conductive materials between the poles of magnets. A generator is a common application of this effect. The Lorentz principal states that ions are separated by a charge when passed between the poles of a magnet, further demonstrating the effects of treating fluids with magnetic fields. There are most likely additional discoveries to be made in the application of magnetic forces to a flowing fluid. Volumes of additional information are available and need not be discussed here.

The hydrogen atom is known to be highly susceptible to the influences of magnetic fields. An application of this principal is the processing proton magnetometer that is used to measure the total magnetic intensity of a sample of hydrocarbon fluid or water. Another application of this well know science is magnetic resonance imaging (MRI). Even though the purpose of both of these concepts is to measure the energy released by the spinning protons after they are aligned by a magnetic field and subsequently disturbed either by the earth's magnetic field or a radio frequency beamed at the sample, they serve to illustrate the scientifically accepted phenomenon of realigning spinning protons with magnetic force. Additionally, such concepts illustrate that energy is released when the spinning protons are so affected.

Spinning protons in fluids including water, alcohol, gasoline, kerosene, and many others act as spinning magnetic dipoles. Under normal circumstances, these protons spin randomly inside their respective atoms. The dipoles are temporarily polarized and aligned by the influence of a magnetic field. Magnets may be employed to create consistent powerful magnetic fields that cause the protons to align and spin in uniform directions. This alignment and subsequent concentration of energy in uniform directions causes an attraction between the hydrocarbon fuel molecule and the oxygen molecule. When used with fuels, the result is increased efficiency by combining more fuel molecules with more oxygen molecules. Hydrocarbon emission tests have been conducted on many vehicles to confirm these facts. Consistently, hydrocarbon emissions have been reduced.

The invention presented herein can be used on all types of equipment that use fuel. Common applications include, but are not limited to, automobiles, trucks, buses, boats, motorcycles, heaters, furnaces, torches, and the like. When used in association with the flow of crude oil in a conduit, the magnetic fluid treatment device also serves to prevent the formation of paraffin and gypsum and other unwanted materials upon the conduit walls. Additional utilization of the invention is to reduce hydrocarbon emissions and increase the efficiency of internal combustion engines and other equipment that uses any type of hydrocarbon based fuel. When used in an agricultural applications, the invention, by increasing the solubility of water, and other phenomenon will enhance plant growth by increasing the amount of water and nutrients the root structure of plants are able to absorb. When used in a waste water treatment application, the invention has proven to enhance the efficiency of waste water treatment facilities by increasing the biological activity of the system. Properly designated magnetic fluid treatment units are recognized with well documented results to increase the efficiency of ion exchange water softener systems thereby reducing the amount of salt needed to regenerate these systems and consequently reducing the volume of toxic salt water brine introduced to the environment. It is further accepted that a properly designated and installed magnetic field will enhance many chemical reactions thereby reducing the amount of chemicals needed to accomplish many tasks such as using chlorine in swimming pools and spas. The application of the magnetic units may also increase the efficiency of natural gas utilization equipment. Many other applications for magnetic fluid treatment currently exist and new ones are being discovered with regularity. The key ingredient appears to be the presence of the hydrogen atom in fluids that are treated with magnetic fields, although there may be other key factors also.

The phenomenon of altering the spin of protons is likewise the reason that a magnetic field will affect the scaling effect that hard water has on conduits and other equipment using water. A similar configuration of magnets has proven to eliminate or reduce the scaling effect of hard water and the corrosive effect of acid water.

Accordingly, it has become well known to employ magnetic fluid treatment devices in fluid conduits to treat the fluid to achieve the benefits mentioned above. However, prior art magnetic fluid treatment devices are typically inefficient in generating a strong magnetic curtain in the fluid flow path and are frequently limited in the sizes of conduit they can treat. Additionally, existing designs require manufacturing techniques that result in high cost due to needing completely different components for each size of conduit. The effectiveness of the magnetic field is, of course, dependent upon the strength of the magnetic field and that strength is also known to be inversely proportional to the square of the distance from the magnetic source. The prior art has been generally ineffective in optimizing the magnetic field strength that may be obtained from a permanent magnet array, and has further been ineffective in treating large systems employing conduits of significant cross sectional diameter in which large volumes of fluid pass. The prior art has further not provided magnetic fluid treatment devices which are modularized to accommodate various fluid flow systems and to allow the magnetic treatment of the same to be tailored to a particular system. Additionally, the prior art has typically not proposed magnetic fluid treatment devices which may be either intrusive for implementation with new fluid flow systems, or non-intrusive to be easily added to existing fluid flow systems.

DISCLOSURE OF INVENTION

In light of the foregoing, it is a first aspect of the invention to provide a magnetic fluid treatment device in which magnets of opposite polarity are placed on a common ferrous steel backing plate, thereby increasing the effective gauss strength of the magnetic field approximately thirty percent.

Another aspect of the invention is to provide a magnetic fluid treatment device which places a single pole of each magnet against a ferrous steel backing plate, thereby further increasing the effective gauss strength of the magnetic field by an additional ten percent.

A further aspect of the invention is the provision of a magnetic fluid treatment device wherein opposite poles of the magnets are positioned diametrically opposed from each other with respect to the conduit carrying the fluid to be treated, thereby further increasing the effective gauss strength of the magnetic field by approximately ten percent.

Another aspect of the invention is to provide a magnetic fluid treatment device wherein magnets of the same polarity are placed on a common ferrous steel backing plate and these plates may be joined by a circuit plate to create a continuous flow of the magnetic field.

Still another aspect of the invention is to provide a magnetic fluid treatment device in which magnets may be place in a section of ferrous steel tubing of sufficient thickness to prevent the penetration of magnetic field through said tubing and form a pathway to complete a circuit of magnetic flow inside the tubing and then to form a curtain of energy through the fluid carrying conduit to be treated when this assembly is plugged into existing conduit.

Yet an additional aspect of the invention is the provision of a magnetic fluid treatment device which places magnetic modules on opposite sides of the conduit carrying the fluid to be treated, such modules being so oriented that a north pole magnet is directly opposite a south pole magnet, thus forming a curtain of magnetic field.

Still a further aspect of the invention is the provision of a magnetic fluid treatment device wherein the thickness of the magnet is equal to the distance between the ferrous steel backing plate and the first point of contact of the magnetic field with the fluid to be treated and wherein the thickness of the magnet is substantially equal to the radius of the conduit carrying the fluid to be treated, insuring a magnetic field of sufficient strength to adequately treat the fluid.

Yet an additional aspect of the invention is the provision of a magnetic fluid treatment device which places identical magnetic modules on opposite sides of the conduit to be treated, to insure that the magnetic field forms a distorted curtain of energy perpendicular to the flow of the fluid to be treated.

Additional aspects of the invention are attained by a magnetic fluid treatment device which employs magnetic modules of sufficient length to allow for adequate contact time of the magnetic field to the fluid to be treated under all flow rates.

Still a further aspect of the invention is the provision of a magnetic fluid treatment device which employs a modular design so that additional units can be added if circumstances require, and which further allows for the mounting of the modules to the conduit in a variety of configurations as circumstances dictate.

Yet an additional aspect of the invention is the provision of a magnetic fluid treatment device which may be non-intrusive to accommodate ease of application to existing fluid systems.

A further aspect of the invention is the provision of a magnetic fluid treatment device which includes a plurality of parallel devices for treatment of large fluid conduits.

Still a further aspect of the invention is the provision of a magnetic fluid treatment device which is reliable and durable in use, and cost effective in implementation.

Another aspect of the invention is the provision of a magnetic fluid treatment device wherein backing plates can be used for either intrusive or nonintrusive designs.

A further aspect of the invention is the provision of a magnetic fluid treatment device in which the integrity of the energy patterns can be maintained by mounting the magnets directly on the inside of the steel shell when conditions are such that the configuration provides a more efficient installation.

The foregoing and other aspects of the invention which will become apparent as the detailed description proceeds are achieved by a magnetic fluid treatment device, comprising: first and second elongated cup shaped members positionally aligned to form a tube; a plurality of magnets received by said elongated cup shaped members, said magnets being arranged in diametrically opposed pairs within said tube; and a fluid conducting conduit extending axially through said tube, said magnets being interposed between said elongated cup shaped members and said conduit.

DESCRIPTION OF DRAWINGS

For a complete understanding of the objects, techniques, and structure of the invention, reference should be made to the following detailed description and accompanying drawings wherein:

FIG. 1 is a cross sectional view of a magnetic fluid treatment device according to one embodiment of the invention;

FIG. 2 is a perspective view of a mounting bracket and permanent magnet employed in the embodiment of FIG. 1;

FIG. 3 is a cross sectional view along the longitudinal axis of the intrusive embodiment of FIG. 1;

BEST MODE FOR CARRYING OUT THE INVENTION

Figure 4:
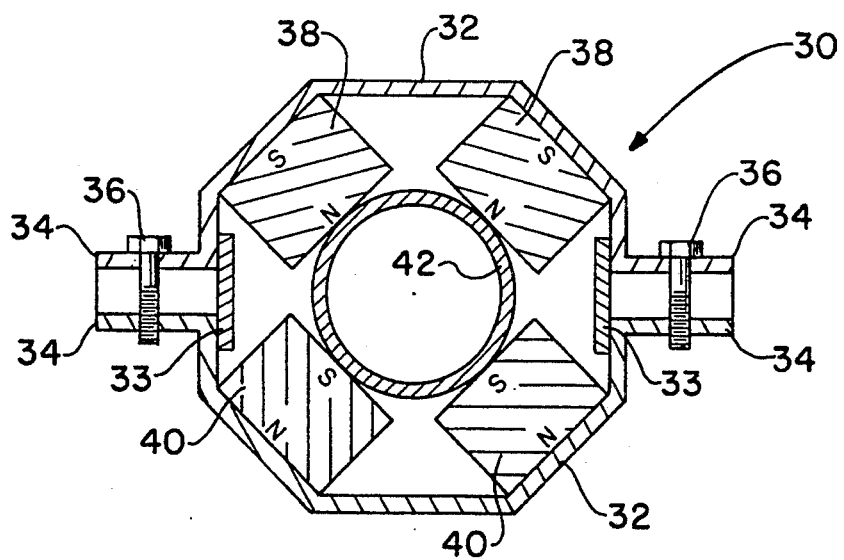
FIG. 4 is a cross sectional view of a non-intrusive add-on magnetic fluid treatment device according to a second embodiment of the invention.

The invention presented herein is an improvement over all prior magnetic fluid treatment devices and is adapted to be used on several sizes of conduit. The individual modules disclosed herein, though designed to be installed on a length of non-ferrous pipe that is to be further installed inside a ferrous steel housing to become part of an assembly, can also be independently installed in the proper configuration and quantity directly on a previously existing non-ferrous conduit. The individual modules can be slightly modified and coated with a plastic protective material and then mounted directly on the preexisting conduit. While some of the effectiveness of this "add-on" embodiment is lost in comparison to the preferred embodiment of the modules being contained within a ferrous steel housing, the principals of magnetically treating the fluids will still effect the desired results.

According to the preferred embodiment of the invention, a north pole module is mounted on a conduit with a south pole module mounted on the diametrically opposed side of the conduit and thus creates the desired curtain of magnetic flux line through the conduit so that the fluid flows orthogonal to the magnetic field. The length of the magnetic fluid treatment device for any given installation will typically be determined upon consideration of such parameters as the diameter of the conduit in proper ratio to the thickness of the magnets, the fluid velocity, the fluid chemistry, and other features of the fluid to be treated. A length of the installation can be varied by adding additional modules along the length of the conduit when the modules are used as individual units rather than assembled inside the steel housing. When the modules are assembled in the steel housing, additional assemblies can be added when conditions so dictate.

The basic modules of the invention are designed in various sizes to accommodate a variety of conduit diameters. Additional magnets are added to the backing plates as the diameter of the conduit increases. Additionally, the radius of the backing plate increases as well to insure that the modules will properly accommodate the larger conduit diameters. A circuit conducting plate is used to accommodate height diameters of close but not exact diameters. For example, a two inch diameter copper water pipe is slightly different in outside diameter than a two inch stainless steel gas line conduit. The slight difference can be accommodated by using a circuit conducting plate that allows for continuity of the magnetic flux along an interrupted path of ferrous steel. The circuit conducting plate is the same length as the backing plate and fills the gap where the two backing plates join along the length of the conduit. Again, the assembly of magnets, backing plates, and circuit conducting plates are mounted on a length of non-ferrous pipe that is appropriate to the size of the existing conduit to be treated and are then fitted inside a steel sleeve that is capped on both ends. A length of the pipe extends beyond the end caps and is of sufficient length to accommodate one of several methods of coupling the assembly to the existing conduit.

The design of the invention is such that the individual modules are mounted on a conduit that is consistent with the fluid to be treated. Conduits designed to carry natural gas differ from those designed to carry water. Further, conduits designed to carry crude oil from underground to the surface in oil well fields are different still.

According to the various embodiments of the invention to be presented hereinbelow, the individual modules are mounted on the conduit in a proper configuration and quantity for the conduit size and fluid to be treated, and then a sleeve of ferrous steel or other appropriate material is installed so that it snugly fits over the assembly. The sleeve is to further contain the magnetic field within the device and further direct the flux lines in a circuit between north and south poles, and offer protection for the modules. An end cap is welded or otherwise affixed to each end of the sleeve. Sufficient pipe length extends beyond each end cap so that a flange can be installed on the conduit that the magnetic modules are mounted to. A similar flange is then installed on the conduit to be treated so that the assembly can be bolted into the existing conduit to form a continuous conduit with the magnetic device now in line with the existing conduit. A similar installation would be that the magnetic unit would not have flanges affixed to the ends, but rather the ends of the conduit that is a part of the unit would simply terminate a sufficient length from the end caps so that the existing conduit and the magnetic unit could be joined by a standard coupling as is common in the plumbing industry.

Figure 6:
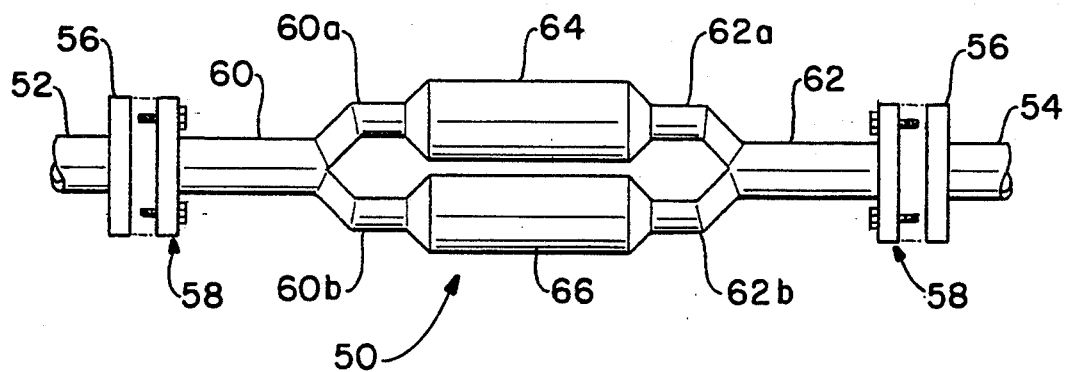
FIG. 6 is a front plan view of a split magnetic fluid treatment device according to the invention, as the same is used for treating large conduits.

Further versatility is gained with the various embodiments of the invention from the ability of the units to be mounted in a manifold structure to accommodate larger pipe diameters. The preferred method is to manufacture the units with flanges on both ends to be installed in a manifold and then the manifold is installed into the existing conduit, again using flanges. Any other means common to the plumbing industry can be used to install the assembly. The purpose for this embodiment, which will be discussed below with respect to FIG. 6, is to provide for efficiency in treating fluid flow in large conduits. It is well known that magnetic energy dissipates at the inverse square of the distance from the face of the magnetic. Therefore, larger diameter conduits have the center of the fluid to be treated a considerable distance from the face of the magnets. To assure that the magnetic curtain fully traverses the entirety of the flow path, a manifold is created so that two or more smaller diameter conduits can carry the same volume of fluid. One or more of the devices are then installed on the smaller size conduit so that the fluid will be in closer proximity to the magnets.

An additional application of the principals of magnetic fluid treatment is in oil wells, as will be discussed below with respect to FIGS. 7-9. It will be seen that only a slight modification of the basic design is necessary to accommodate this application. The basic configuration of magnetics would still be used to create the magnetic field lines so that the fluid would flow orthogonally to the flux lines, and only the method of holding the magnetics in place around the conduit would necessarily be changed. To accomplish this, the magnets are mounted directly on the outer shell and held in place by the attraction of the magnets themselves to the ferrous steel shell. In place of ferrous steel backing plates being used to hold the magnets in place, non-ferrous spacers are used to hold the individual magnets in the proper configuration. A non-ferrous pipe is then inserted so that it fits tightly against the magnets that now form an inner diameter to the outer casing. It is through this pipe that the crude oil will flow. End caps are again welded to the steel shell. The end caps are threaded to accommodate standard oil well tubing. The steel conduit containing the magnets is manufactured in accordance with existing standards for oil well down hole requirements. The unit effectively becomes a "pup joint" as is common in the oil well industry.

As presented above, the implementation of magnetic fluid treatment devices in oil well applications is to prevent the formation of paraffin, asphaltines, gypsum, and other undesirable material in the oil well string lines below ground and in the oil transfer lines above ground. For this embodiment, the unit would be installed on existing oil well units and prior to the formation of paraffin in the string line, commonly known as the paraffin zone. A further application would be below the pump at the bottom of the oil well. This application is to prevent the formation of scale on the pump.

With an appreciation of the foregoing, and with reference now to the drawings, specific details of the various embodiments of the invention can now be appreciated. With particular reference to FIG. 1, it can be seen that a magnetic fluid treatment device according to the invention is designated generally by numeral 10. The device 10 employs a cylindrical ferrous steel pipe 12, the same being highly conductive to magnetic energy. Concentric to and received within the steel pipe 12 is a fluid conduit 14. According to the invention, the fluid conduit 14 is of a non-magnetic material such as copper, pvc, or the like.

As shown in FIGS. 1 and 2, a pair of mounting brackets 16, again of ferrous steel construction, are provided. Each of the mounting brackets 16 is of semicylindrical configuration, and each is adapted to receive either a first set of magnets 18, or a second set of magnets 20. As illustrated in FIG. 1, the magnets of the set 18 are diametrically opposed to the magnets of the set 20. As will also be appreciated by those skilled in the art, the magnets of the set 18 are oriented oppositely from those of the set 20. In the embodiment shown in FIG. 1, the south pole of the magnets 18 is impressed against the mounting bracket 16, with the north pole thereof in intimate relationship with the copper pipe 14. In contradistinction, the magnets 20 are provided with the north pole in engagement with the mounting bracket 16 and the south pole in intimate engagement with the copper pipe 14. This positioning assures that a strong curtain of magnetic flux is introduced across the pipe 14 and orthogonal to the direction of fluid flow therein. As presented above, the ferrous steel pipe 12, serving in conjunction with the mounting brackets 16 and a backing plate, completes the magnetic circuit of the device 10 and greatly improves the strength of the magnetic field generated thereby.

With reference to FIG. 3, it can be seen that conical end caps 22 are welded or otherwise secured to the ends of the cylindrical housing or steel pipe 12. Each of the end caps 22 is provided with an opening at an end thereof to receive the fluid conduit 14 therethrough. Also provided as part and parcel of the device 10 are mounting flanges 24 at each end of the conduit 14. Each of the flanges 24 is provided with a plurality of uniformly circumferentially spaced bolts 26 which are adapted to make securing engagement with mating flanges secured to the fluid conduit into which the device 10 is to be inserted. Such an insertion would result in an intrusive unit, as that term is intended herein.

It will be appreciated that the magnetic fluid treatment device 10 is provided with a self contained back plate consisting of the ferrous steel pipe 18 and the pair of mounting brackets 16, the same being in intimate contact with each other to provide a complete and effective magnetic circuit. It will further be appreciated that the device 10 is modularized, in that the structure thereof is contained within a single unit as shown in FIG. 3, the same being readily adapted for implementation in existing fluid conduits.

Figure 5:
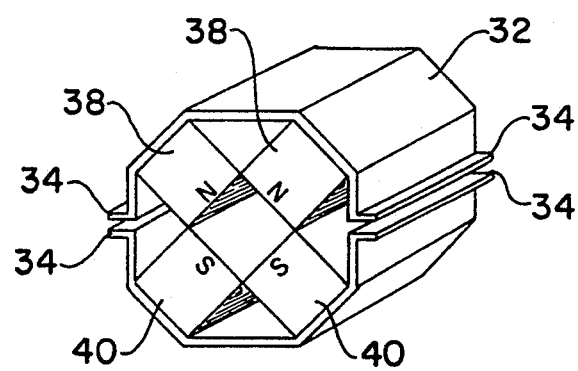
FIG. 5 is a perspective view of the embodiment of FIG. 4.

With reference now to FIGS. 4 and 5, an appreciation of a magnetic fluid treatment device which is modularized and of the add-on type can be seen as designated by the numeral 30. In this embodiment of the invention, a pair of magnetically conductive ferrous steel housing members 32 are provided with flanges along opposite sides thereof for secured engagement with each other as by a plurality of bolts 36 spaced therealong. Received within the housing defined by the members 32 are diametrically opposed magnets of opposite polarity. While any number of such magnets may be employed, in the embodiment shown in FIGS. 4 and 5 a pair of magnets 38 are employed with their south poles impinging against the associated housing member 32, and diametrically opposed from a pair of magnets 40 having their respective north poles engaging the associated housing member 32. The opposite poles of the magnets 38, 40 are in contacting engagement with the nonmagnetic conduit 42 which passes axially and centrally through the housing 32.

According to the invention, it is preferred that the thickness of each of the magnets employed, measured from the face of the north pole to the face of the south pole, be substantially equal to the radius of the fluid conduit. In the embodiment of FIGS. 4 and 5, it will be appreciated that the magnets 38, 40 have a thickness which is substantially equal to the cross sectional radius of the conduit 42. It has been found that such an arrangement of magnets in association with the conduit provides a magnetic flux curtain of sufficient strength to achieve the objectives of the invention. Similarly, the length and/or number of magnetic fluid treatment devices employed will typically be a function of the type of fluid being treated, its flow rate, and other related parameters. Employing the add-on device of FIGS. 4 and 5, it has been found that a length of four inches is suitable for treatment of most fuel lines.

It should now be appreciated that the concept of the invention includes both intrusive devices such as that of FIG. 3, and clamp-on or add-on types of devices such as those of FIGS. 4 and 5. Obviously, for existing systems the add-on device is most easily employed since no interruption of fluid flow nor interference with the fluid conduit is necessary. The housing members 32, carrying their associated magnets 38, 40, need simply be clamped over an existing fluid conduit 42.

It will be appreciated that the circuit between the housing members 32 may be enhanced by bridging the gap between the members with a circuit conducting plate 33, as shown in FIG. 4. With the circuit conducting plates 33 extending the length of the housing members 32 an integral conductive backing plate is defined. The plates 33 accommodate the gap between the housing member 32 which occurs when various sizes of conduit have been receive therein. Of course, the plates 33 may also be employed in intrusive units as well or anywhere that gaps in the backing plate or housing members occur.

The embodiments presented above have been depicted such that one mounting bracket has north pole faces in intimate contact therewith, while the other mounting bracket has south pole pieces so arranged. An alternative way to achieve the curtain of magnetic flux through the conduit and to even further increase the intensity of the field is to affix the north pole face of one magnet and the south pole face of another magnet onto the same mounting bracket and to then engage a pair of such brackets onto a conduit with north and south pole faces being diametrically opposed. Such an arrangement is also contemplated as a portion of the invention. For example, in FIGS. 4 and 5, one diametrically opposed pair of magnets 38, 40 would simply be reversed so that the north pole face of one of the magnets 40 would be adjacent the conduit 42 and the south pole face of the diametrically opposed magnet 38 would be adjacent the conduit 42. It is well known that the strength of a magnetic field decreases according to the square of the distance from the surface of the magnet generating the field. Accordingly, with the field being generated by magnets external to the fluid conduit, the efficiency of the magnetic treatment of large diameter conduits is greatly frustrated. Accordingly, the invention contemplates the splitting of large conduits into a plurality of parallel conduits of smaller diameter each such smaller diameter conduit having an associated magnetic fluid treatment device which efficiently and effectively treats the fluid passing therethrough. As shown in FIG. 6, a split magnetic fluid treatment device according to the invention is designated generally by the numeral 50. Here, an input conduit 52 passes fluid to an output conduit 54, such conduits being of the same substantial diameter. Each of the conduits 52, 54 is provided with a mounting flange 56 which is adapted to mate with the flange assemblies 58 of the split magnetic fluid treatment device 50. The split device 50 includes an input conduit 60 and an output conduit 62, each of which is preferably of the same cross sectional area and diameter as the associated input and output conduits 52, 54.

As shown in FIG. 6, the conduit 60 of the device 50 splits into a pair of substantially equal legs 60a, 60b for interconnection with respective magnetic fluid treatment devices 64, 66. The outputs of such devices are connected to the split legs 62a, 62b, which interconnect with output conduit 62 of the device 50. In the preferred embodiment of the invention, the cross sectional areas of the legs 60a, 60b, 62a, 62b, are proportionally sized so that the total volume carrying capacity of the legs together equal the capacity of the conduits 60, 62. Accordingly, the effective fluid flow path employing the device 50 is of uniform cross section and the flow of the fluid is not impeded.

The magnetic fluid treatment device 64 interposed between the conduits 60a and 62a and the magnetic fluid treatment device 66 interposed between the conduits 60b and 62b are substantially identical and would typically be made in accordance with the teachings of the invention as depicted, for example, in FIG. 3. A plurality of diametrically opposed magnets received within a magnetically conductive ferrous housing generates a magnetic flux curtain through the fluid conduits passing therethrough. Since the fluid conduits are of substantially lesser diameter than the diameter of the main conduits 52, 54, the effective strength of the magnetic field imposed upon the fluid is significantly greater than if a single magnetic fluid treatment device had been used rather than the split device 50 comprising a plurality of magnetic fluid treatment devices 64, 66 as shown. Of course, depending upon the size of the input and output conduits, the number of such devices 64, 66 can be altered.

Figure 7:
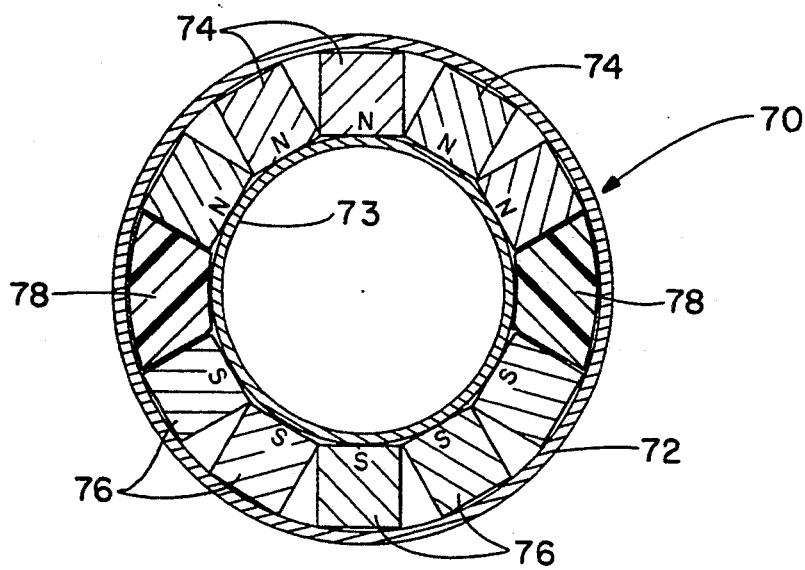
FIG. 7 is a cross sectional view of a magnetic fluid treatment device for treating crude oil and other petroleum products.
Figure 8:
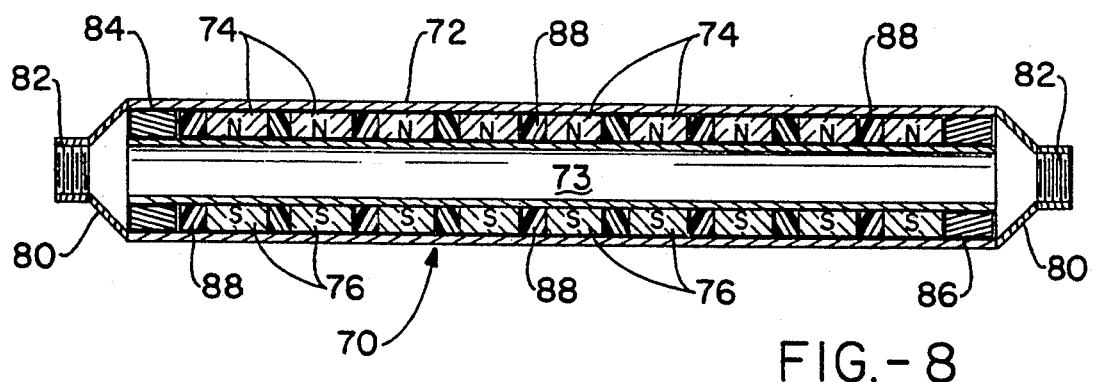
FIG. 8 is a cross sectional view of the magnetic fluid treatment device of FIG. 7 taken along the longitudinal axis thereof.

Referring now to FIGS. 7 and 8, an appreciation can be obtained of the structure and operation of the magnetic fluid treatment device 70 employed for oil field use, treating crude oil to prevent the buildup of paraffin, asphaltines, gypsum, scale, and the like. An outer steel shell 72 is provided with conical end caps 80 and receives a coaxial inner copper conduit 73, as shown. A plurality of magnets 74, 76 are diametrically opposed with respect to the inner conduit 73 and are maintained between the outer steel shell 72 and the conduit 73. In standard fashion, the diametrically opposed pairs of magnets would be oppositely faced, one having its north pole adjacent the conduit 73, and the other the south pole. In the embodiment shown in FIG. 8, the magnets 74 have their north pole interposed against the conduit 73, while the diametrically opposed magnets 76 have their south poles so positioned. As further shown in FIG. 8, a plurality of so aligned magnet pairs 74, 76 are axially spaced along the magnetic fluid treatment device 70, the number being a function of the specific nature of the oil being treated and the flow rate thereof.

As further shown in FIG. 7, a plurality of spacers 78 are positioned between the axially aligned circular arrangement of the magnet pairs 74, 76. In the preferred embodiment of the invention, the spacers 78 are of a suitable plastic or other nonferrous material and comprise legs of the magnet holders 88 to be discussed below.

Threaded connectors 82, of the type typically used in oil field operations, are provided at the ends of the end caps 80, as shown. Metal spacers 84, 86 are provided, one at each end of the steel shell housings 72. The spacers 84, 86 provide a heat sink so that the spacers 78 will not melt when the end caps 80 are welded to the housing 72.

Figure 9:
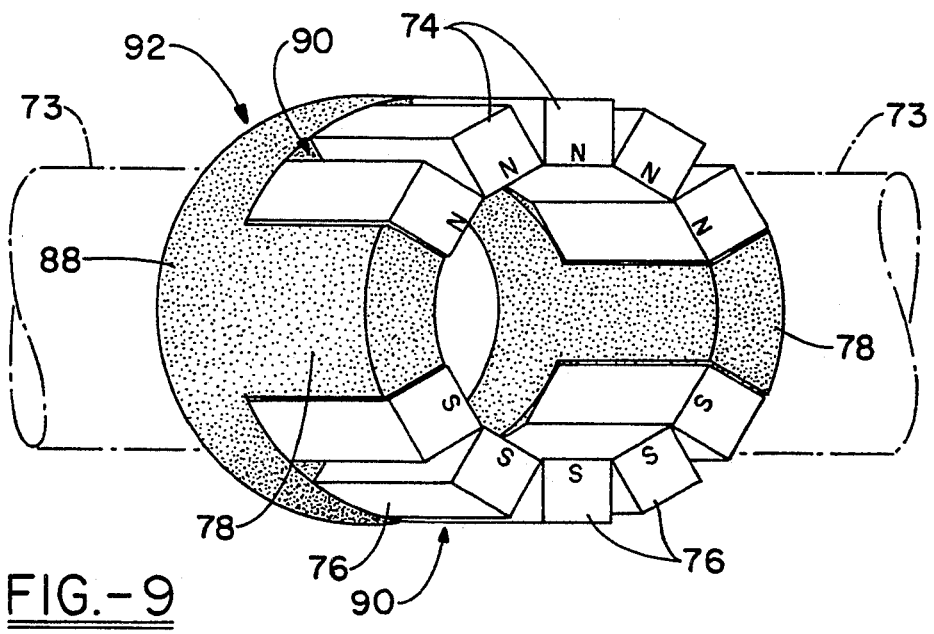
FIG. 9 is a perspective view of a magnetic holder/spacer employed in the embodiment of FIGS. 7 and 8.

As shown in FIGS. 8 and 9, magnet holders 88 are provided to receive the various magnets 74, 76 and to maintain them in the appropriate diametrically opposed relationship with respect to each other. Magnetic holders 88 also serve as the spacers to keep the magnet pairs 74, 76 circumferentially and axially displaced from each other. As best shown in FIG. 9, the magnet holders 88 comprise a cylindrical member having side wall sections 90 removed therefrom, thereby defining the spacers 78. The removed portion has a length substantially equal to the length of the magnets 74, 76 to be received thereby. Additionally, the arc length of the section removed is such as to accommodate the appropriate number of magnets in a set. The conduit 73 is received within a central axial bore of the magnet holder 88, with the holder 88 then being received within the cylindrical shell 72. In effect, the magnet holder 88 and associated magnets 74, 76 comprise a magnetic subassembly 92 adapted for receipt over the conduit 73 and within the shell 72. Such subassemblies are simply slid into position during the manufacturing process and before the attachment of the end caps 80 to the steel shell 72 as by welding or the like.

Figure 10:
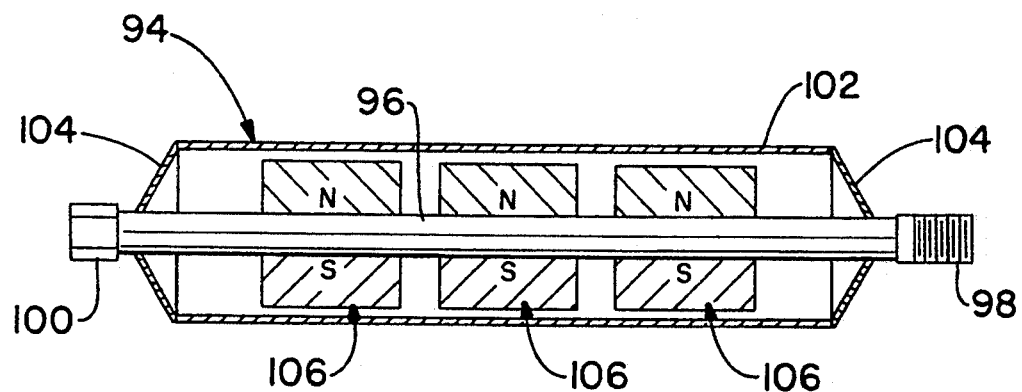
FIG. 10 is a cross sectional view of a magnetic fluid treatment device employed in the treatment of natural gas.

With reference now to FIG. 10, a specific magnetic fluid treatment device 94, intended for use with natural gas conduits, is shown. As illustrated, the device 94 receives a stainless steel gas line 96 having standard threaded couplings 98, 100 at opposite ends thereof. A steel casing 102 having conical end caps 104 welded or otherwise suitably affixed to the opposite ends thereof receives the gas line 96 as illustrated. Permanent magnet arrays 106 are axially positioned along the gas line 96 within the magnetically conductive casing 102, as shown. In accordance with the teachings of the invention, the arrays 106 comprise diametrically opposed pairs of permanent magnets with opposite polarities facing each other across the conduit 96. The magnets 106 may, of course, be mounted directly on the steel conduit 96. In such a case, suitable spaces extending axially along the conduit 96 may be employed to assume proper spacing and alignment of the magnets. The magnetically passive spacers are typically the same length as the magnets and configured to be received therebetween.

Figure 11:
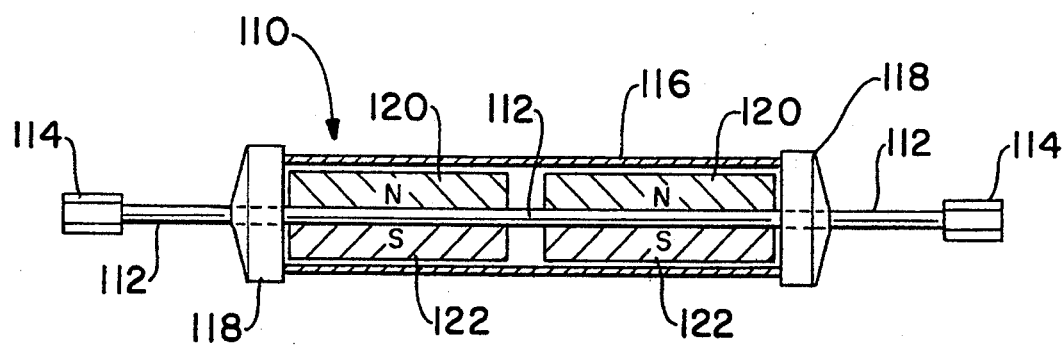
FIG. 11 is a cross sectional view of a magnetic fluid treatment device employed for treating the fuel within a fuel line.

As shown in FIG. 11, a magnetic fluid treatment device for fuel lines is designated by the numeral 100. Here, a fuel line 112 for vehicles or other use is provided with a standard threaded coupling 114 at opposite ends thereof. The fuel line 112 passes through a magnetically conductive ferrous steel housing 116 having the end caps 118 welded to opposite ends thereof. Magnet arrays, comprising diametrically opposed pairs of magnets 120, 122, are provided across the fuel line 112 in a manner presented above. The number of magnets employed will be a function of the nature of the fuel being treated and its rate of flow through the device 110.

Thus it can be seen that the objects of the invention have been satisfied by the structure presented above. While in accordance with the patent statutes only the best made and preferred embodiments of the invention have been presented and described in detail, it is to be understood that the invention is not limited thereto or thereby. Accordingly, for an appreciation of true scope and breadth of the invention, reference should be made to following claims.

What is claimed is:

1. A magnetic fluid treatment device, comprising:
   first and second elongated cup shaped members positionally aligned to form a tube;
   a plurality of magnets received by said elongated cup shaped members, said magnets being arranged in diametrically opposed pairs, within said tube;
   a fluid conducting conduit extending axially through said tube, said magnets being interposed between said elongated cup shaped members and said conduit;
   a tubular housing receiving said elongated cup shaped members, said tubular housing being capped at opposite ends thereof with caps extending between said tubular housing and said conduit; and
   further comprising a plurality of said tubular housings, each receiving said first and second elongated cup shaped members and said plurality of magnets, and each having a conduit extending axially therethrough, said conduits being interconnected at opposite ends thereof to respective inlet and outlet conduits, said conduits having an aggregate cross sectional area substantially equal to the cross sectional area of the inlet and outlet conduits to which they are connected.

2. A magnetic fluid treatment device, comprising:
   a plurality of elongated cup shaped members positionally aligned to form a tube;
   a plurality of magnets received by each of said elongated cup shaped members, said magnets being arranged in diametrically opposed pairs, within said tube;
   a shell receiving said elongated cup shaped members and magnets in axially aligned relationship;
   a fluid conducting conduit extending axially through said tube, said magnets being interposed between said shell and said conduit; and
   wherein said cup shaped members comprise magnet holders maintaining said magnets in axial and circumferential alignment, said magnet holders comprising cylindrical members having portions of wall sections removed therefrom defining openings receiving said magnets, said openings extending from a first end of said cylindrical member and terminating short of a second end, said magnet holders being received within said tube in abutting relationship, said first end of each magnet holder abutting said second end of an adjacent magnet holder.

3. The magnetic fluid treatment device according to claim 2, wherein said magnet holders are magnetically nonconductive.

4. The magnetic fluid treatment device according to claim 2, wherein said shell is magnetically conductive.

5. The magnetic fluid treatment device according to claim 4, wherein remaining portions of wall sections between said removed portions comprise circumferentially positioned spacers in said magnet holders.

6. The magnet fluid treatment device according to claim 5, wherein said second end of each said magnet holder comprises an axial spacer, said circumferential and axial spacers maintaining said magnets in fixed axial and circumferential relationship between said shell and said conduit.

* * * * *